A. MANHEIMER, F. M. ETTER, AND J. H. KINTZELE.
WASHER PLACING MACHINE FOR RUBBER HEEL MOLDS.
APPLICATION FILED DEC. 16, 1921.
1,424,931.
Patented Aug. 8, 1922.
7 SHEETS—SHEET 1.
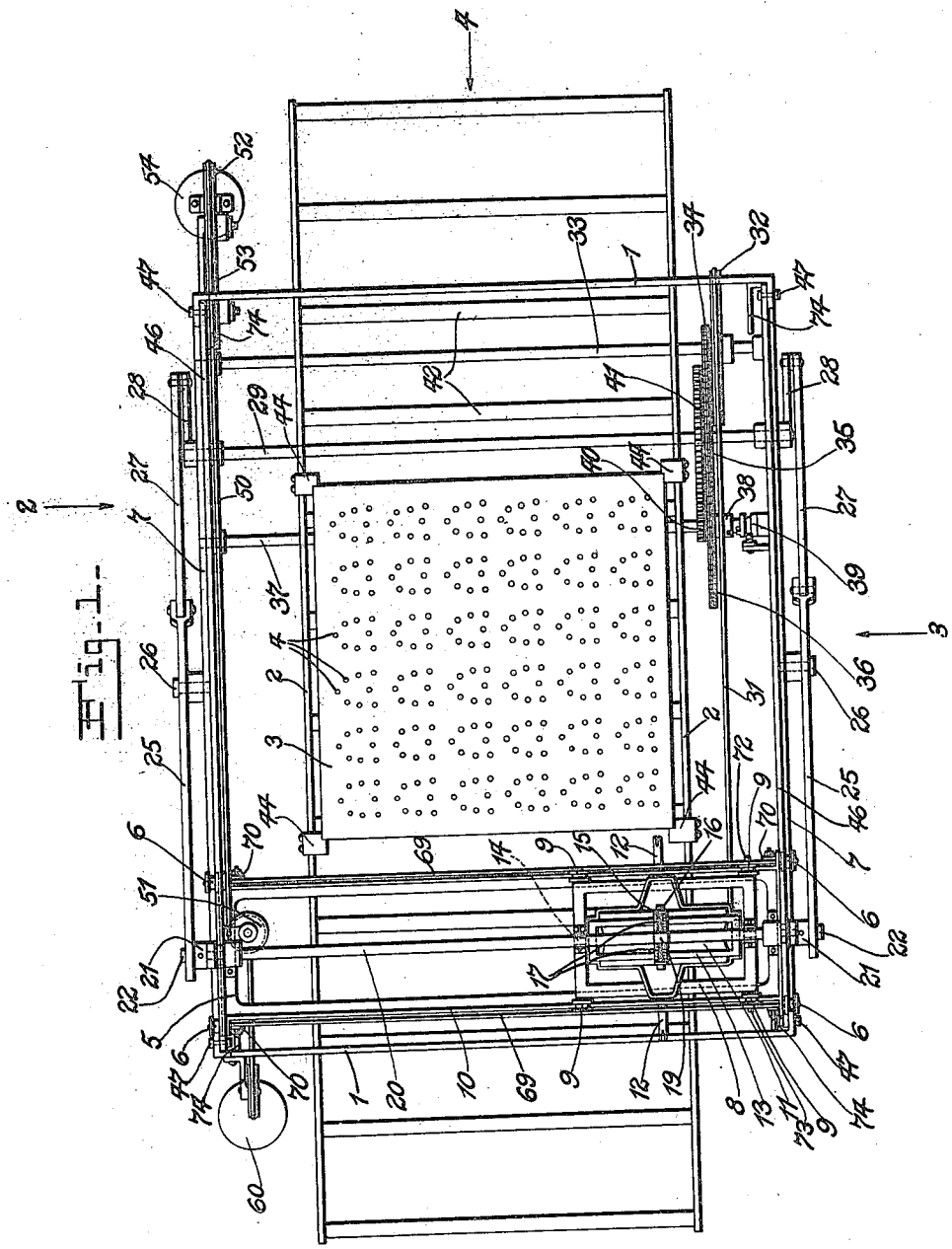
Inventors.
Abraham Manheimer,
Frederick M. Etter,
Julius H. Kintzele,
by Rippey Kingsland
Their Attorneys.

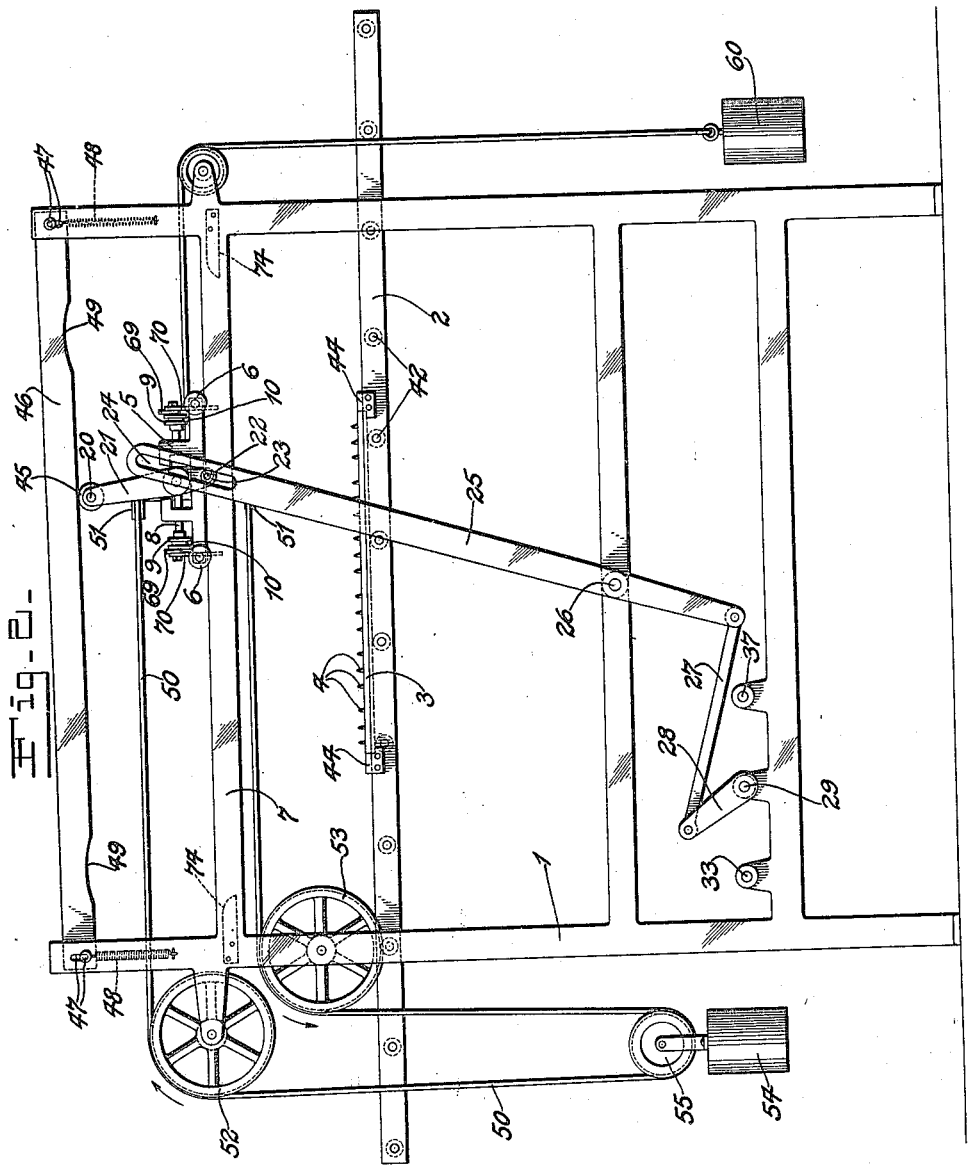

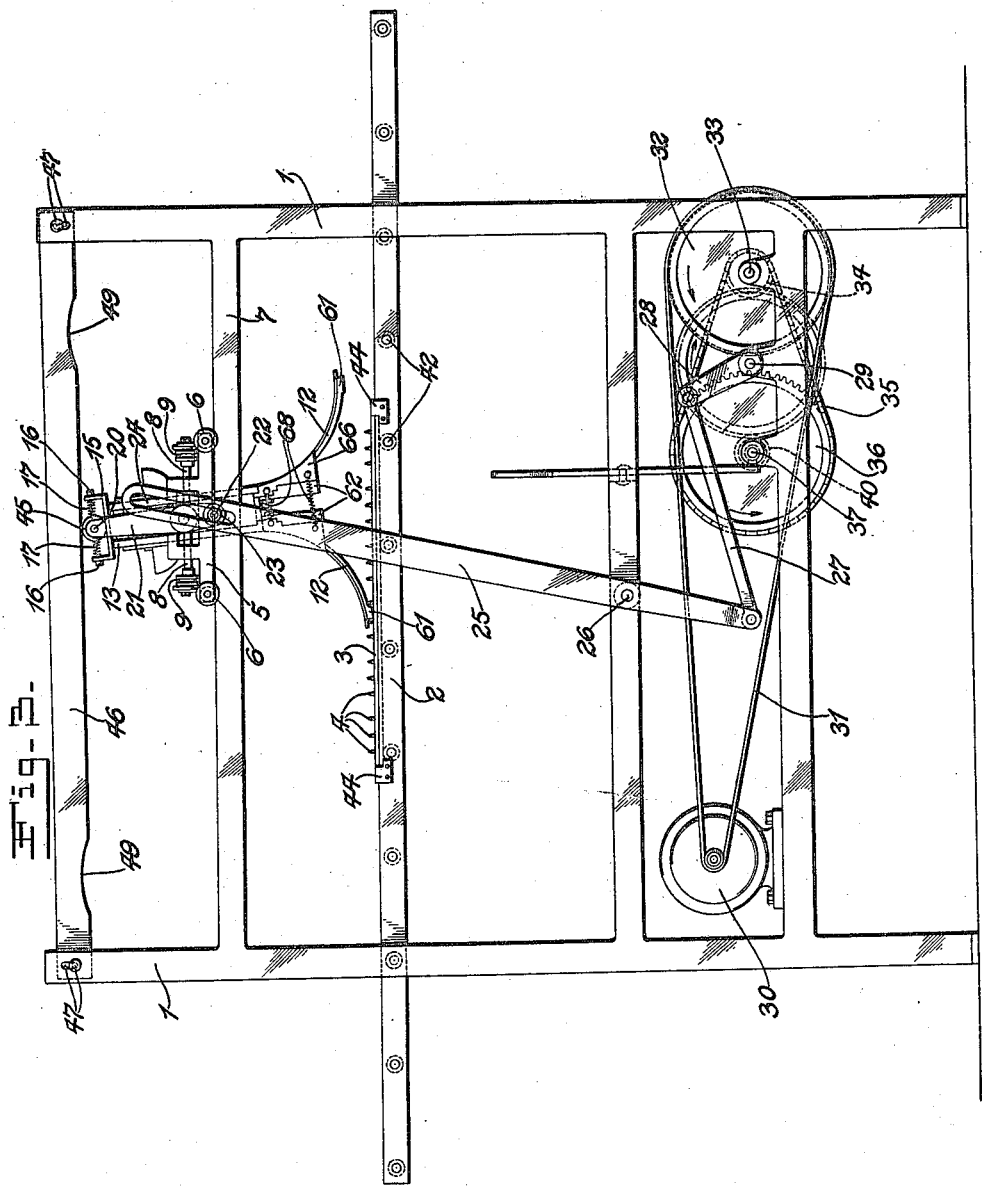

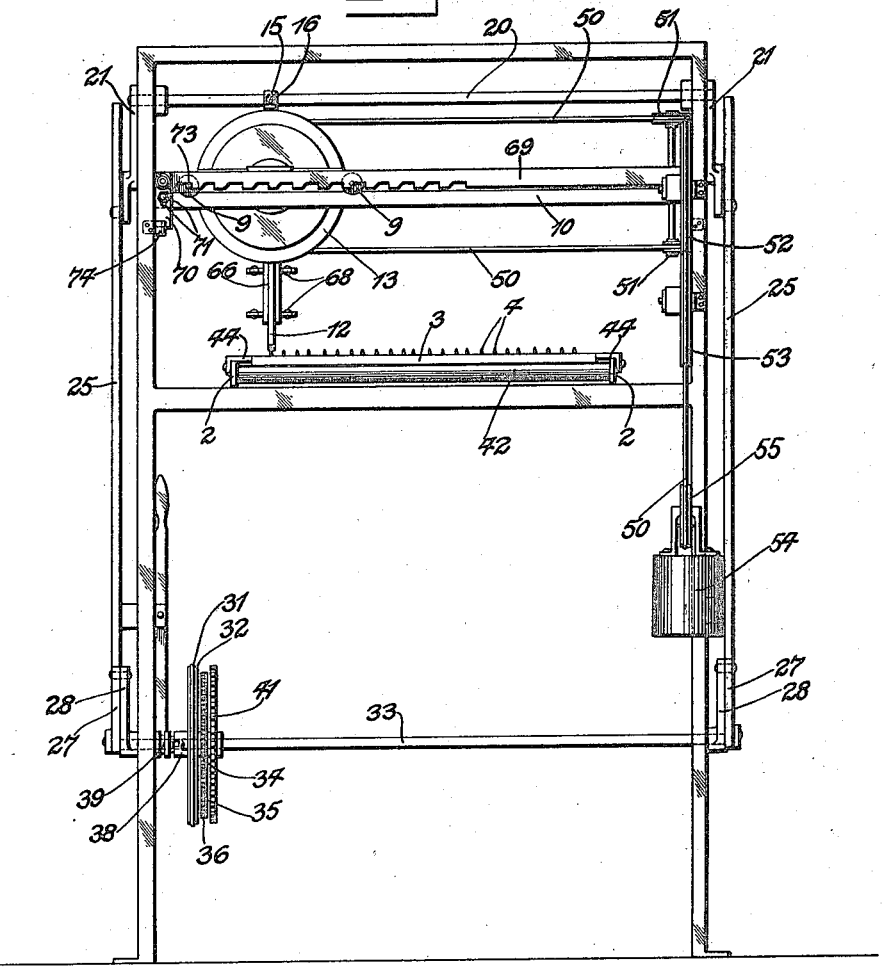

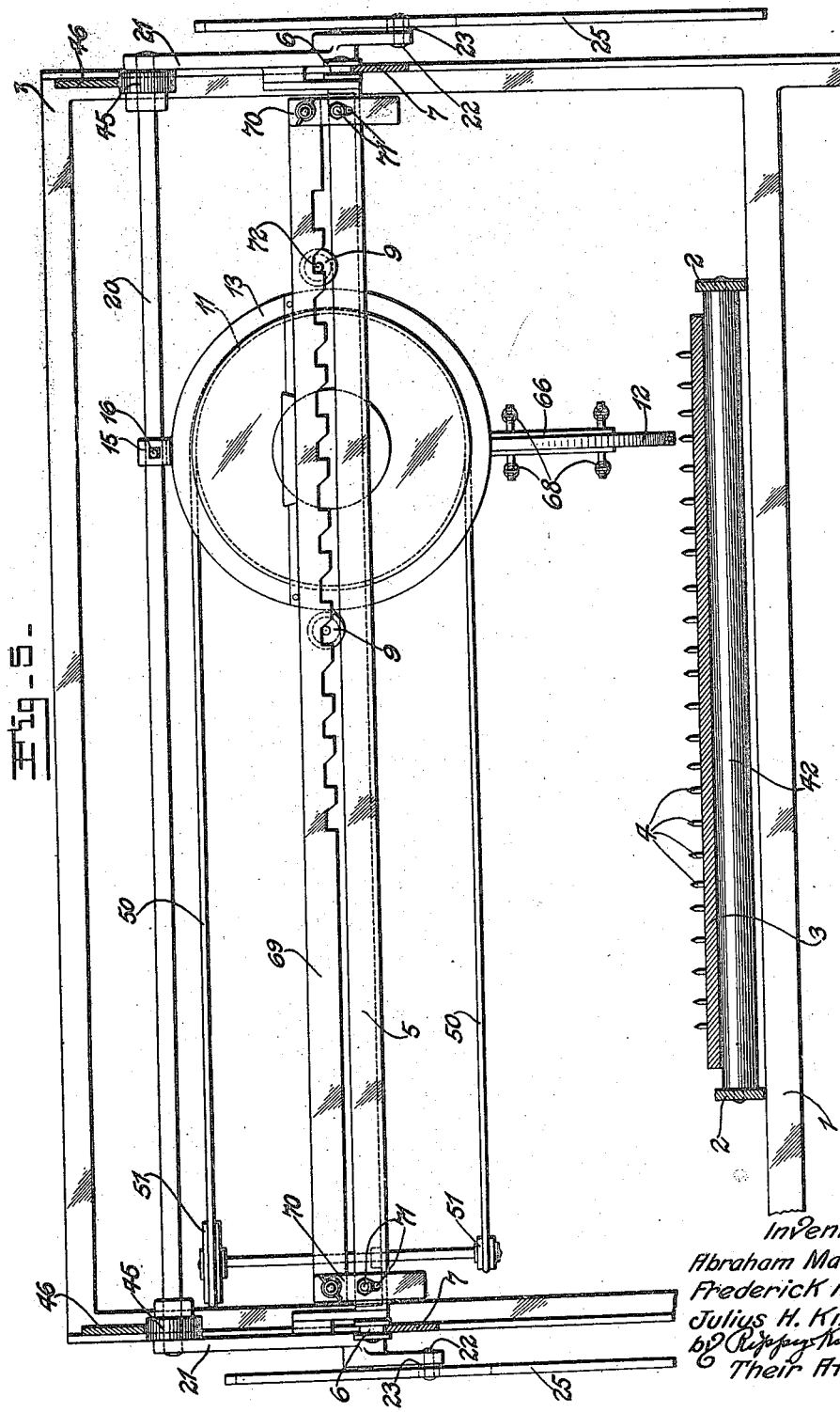

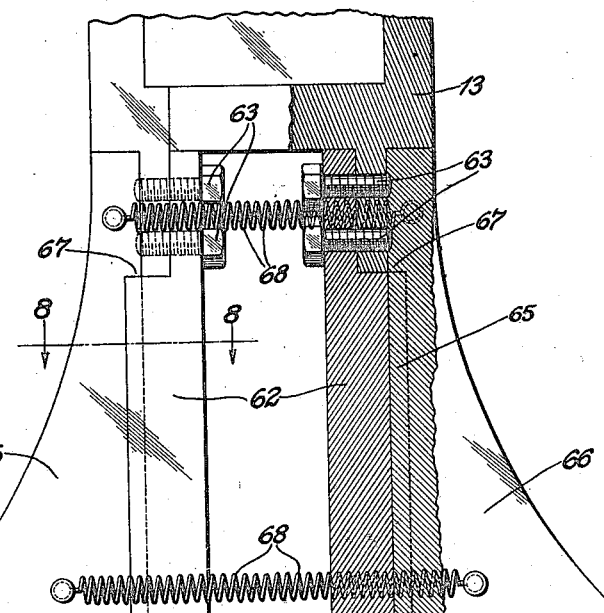
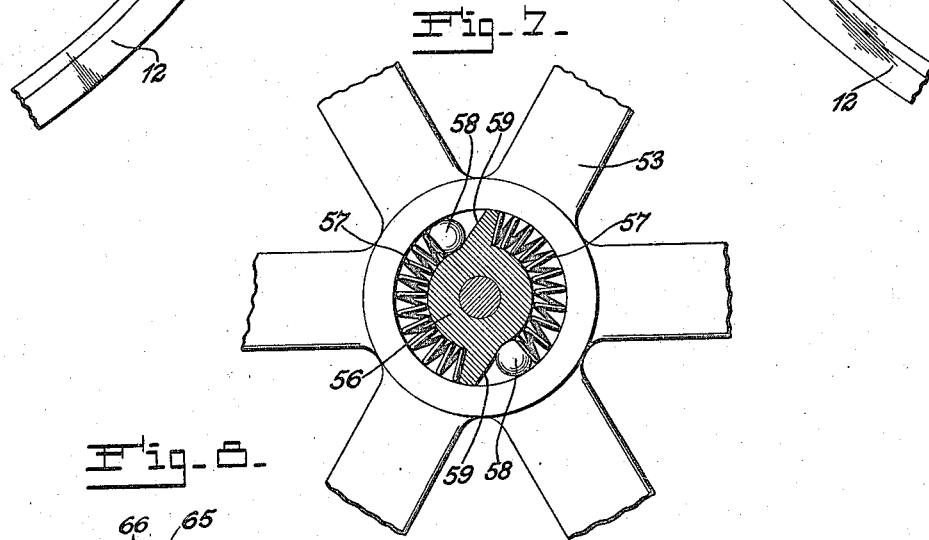
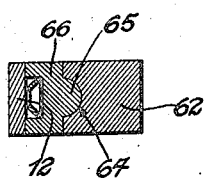

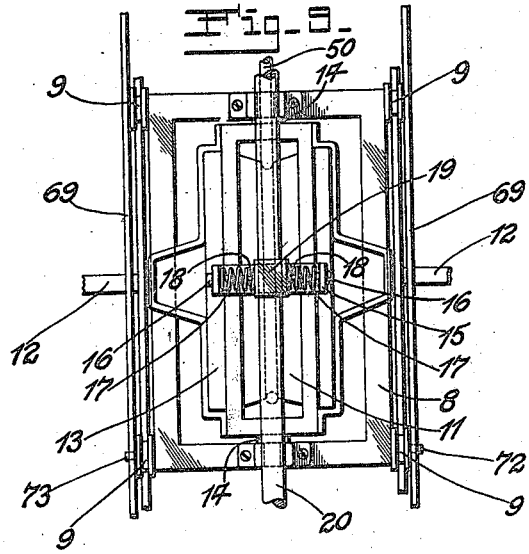
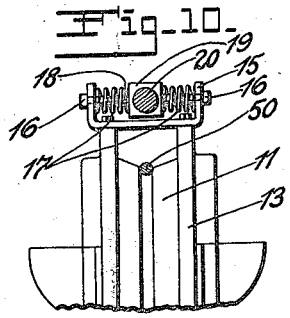
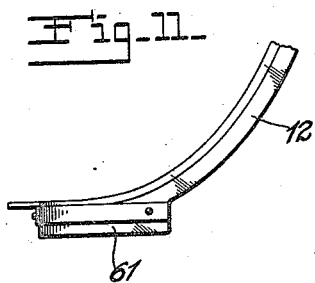
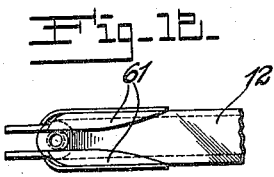

UNITED STATES PATENT OFFICE.

ABRAHAM MANHEIMER, FREDERICK M. ETTER, AND JULIUS H. KINTZELE, OF ST. LOUIS, MISSOURI.

WASHER-PLACING MACHINE FOR RUBBER-HEEL MOLD.

1,424,931.    Specification of Letters Patent.    Patented Aug. 8, 1922.

Application filed December 16, 1921. Serial No. 522,734.

*To all whom it may concern:*

Be it known that we, ABRAHAM MANHEIMER, FREDERICK M. ETTER, and JULIUS H. KINTZELE, citizens of the United States, and residents of the city of St. Louis and State of Missouri, have invented a new and useful Washer-Placing Machine for Rubber-Heel Molds, of which the following is a specification.

This invention relates to machines for placing washers for rubber heel molds.

In a prior application filed by us on August 31, 1821, Serial No. 497,299, we disclosed a machine for the purpose mentioned, including a support for the mold plate that carries the pins for the washers for rubber heels, and mechanism for placing the washers on the pins on the mold plate automatically and as an incident to the operation of the machine. To apply the washers to the pins automatically and as an incident to the operation of the machine it is necessary to effect a relative movement as between the mold plate and the washer placing mechanism, and it is obviously immaterial whether the pin support be moved relative to the washer placing mechanism or vice versa, since the washers will be placed on the pins properly in either case.

The present invention comprises mechanism for effecting such relative movement so that the washers will be placed upon the pins automatically and as an incident to the operation of the machine. Although the embodiment of the invention shown comprises means for moving the washer placing mechanism relative to the mold plate, we do not restrict ourselves to this form of the invention.

An object of the invention is to provide an improved machine of the character and for the purpose mentioned in which the co-operation of the parts is obtained in a highly efficient and satisfactory manner.

Another object of the invention is to provide an improved applying mechanism and means for controlling it to place the washers upon the pins automatically and as an incident to the operation of the machine.

A specific object of the invention is to improve generally the construction and operation of the machine.

Various other objects of the invention will appear from the following description, reference being made to the drawings, in which—

Fig. 1 is a plan view of the machine embody our present invention.

Fig. 2 is a side elevation looking in the direction of the arrow 2 in Fig. 1.

Fig. 3 is a side elevation looking in the direction of the arrow 3 in Fig. 1.

Fig. 4 is an end elevation looking in the direction of the arrow 4 in Fig. 1.

Fig. 5 is a cross sectional view of the upper part of the machine.

Fig. 6 is an enlarged detail view with parts in section showing a construction by which a proper co-operative action of the washer placing mechanism is obtained.

Fig. 7 is a sectional view showing a device for controlling one of the wheels or pulleys over which one of the actuating belts passes.

Fig. 8 is a sectional view on the line 8—8 of Fig. 6.

Fig. 9 is an enlarged detail view showing the arrangement by which the washer magazine is inclinably supported.

Fig. 10 is an enlarged detail view showing parts of the device by which the washer magazine is moved to and supported in its inclined positions.

Fig. 11 is an enlarged side elevation of the delivery end of one of the fingers that guide the washers to the pins.

Fig. 12 is a lower side or a bottom view of the same.

In the embodiment of the invention shown the machine comprises a frame 1 having a support 2 for the mold plate 3 that carries the mold pins 4 on which the washers are placed. The machine also comprises a support for the mechanism that places the washers on the pins 4, and mechanism for obtaining a relative movement between the washer placing mechanism and the mold plate so that the washers will be placed on the pins 4 automatically and as an incident to the operation of the machine.

In the embodiment of the invention chosen for illustration, the washer placing mechanism is moved relative to the mold plate, although if desired the mold plate may be moved relative to the washer placing mechanism. In the form of the invention shown, the carriage 5 having rollers 6 for operation on rails 7 is arranged for movement back and forth above the mold plate; and another carriage 8 having rollers 9 operating on rails 10 in the carriage 5 is arranged for movement back and forth above the mold plate 3 at an angle to the line of movement of the carriage 5. The carriage 8 is supports the washer placing mechanism comprising a rotary magazine 11 arranged to contain washers to be placed on the pins 4, and fingers 12 arranged to receive washers from the magazine 11 and to guide the washers to the pins 4. The pins 4 engage and retain the washers conducted thereto by the fingers 12 automatically and as an incident to the operation of the machine, it only being necessary to effect a relative movement, to obtain this result, between the washer placing mechanism and the mold plate.

The internal construction of the magazine 11 and means for discharging the washers from the magazine into the fingers 12 are not shown in detail in the present drawings, and it is sufficient for present purposes to assume that such construction and means may be the same as disclosed in our said application Serial No. 497,299; or that any appropriate construction and means may be used whereby the magazine 11 will contain and discharge washers into the fingers 12 automatically and as an incident to the operation of the machine and as the washers are placed on the pins 4.

The magazine 11 is supported in the carriage 8 for movement to different oppositely inclined positions to place either of the fingers 12 in operative relationship to deliver washers to the pins 4. The magazine 11 is supported for rotation within a laterally inclinable non-rotative frame 13 having extensions 14 mounted for rocking movements in the carriage 8. The inclinable non-rotative frame 13 has a bracket 15 in connection with its upper side. Bolts or projections 16 extend inwardly from the upwardly extending arms of the bracket 15 and support the outer ends of springs 17 whose inner ends are supported on projections 18 from a block 19 slidable on a rod 20. The rod 20 is supported by the upper ends of a pair of levers 21. The levers 21 are pivoted intermediate of their upper and lower ends to opposite ends of the carriage 5 and have pins 22 on their lower ends provided with rollers 23 within slots 24 in the upper ends of a pair of levers 25. The levers 25 are pivoted on supports 26 and have their lower ends connected by links 27 to crank arms 28 on a shaft 29. Obviously rotation of the shaft 29 will oscillate the levers 25 and move the carriage 5 back and forth above the mold plate. The shaft 29 is driven by speed reducing gearing from a motor 30. The speed reducing gearing may be of any appropriate form. As shown, a belt 31 driven by the motor operates a pulley 32 on a shaft 33 (Figs. 1 and 3). A small sprocket wheel 34 in connection with the pulley 32 drives a sprocket chain 35 which engages a sprocket wheel 36 loosely supported by a shaft 37, and having a clutch member 38 in connection with one side thereof. A clutch member 39 that turns with the shaft 37 is feathered on said shaft 37 in the usual well known manner for movement into and out of engagement with the clutch member 38 to control the operation of the sprocket wheel 36. A small gear wheel 40 in connection with the sprocket wheel 36 meshes with a large gear wheel 41 on the shaft 29. Thus, the gearing described may be operated or not, as desired, when the motor is running. When the gearing is operated the levers 25 are continuously oscillated with the result that the carriage 5 is moved back and forth over the mold plate. Or, if desired, the carriage 5 with the washer placing mechanism therein may be maintained stationary while the mold plate is moved relative thereto. For instance, the mold plate may be movably mounted on supports 42 within the frame 2, and may be moved manually or otherwise as desired. In case the washer placing mechanism is moved, the mold plate may be held stationary by brackets 44 in connection therewith arranged for clamping engagement with the frame 43.

As stated, in the embodiment of the invention shown the non-rotative frame 13 is arranged to be inclined to different positions in the carriage 8. In a machine in which the washer placing mechanism moves relative to the mold plate, the inclination of the frame 13 is away from the direction of movement of the carriage 5. For instance, referring to Fig. 3, the carriage 5 is moving toward the right while the frame 13 inclines to the left so that the curved finger at the left is in position to place washers on the pins 4. When the carriage 5 reaches the end of its movement, which is after washers have been placed on all pins in the row of pins to which washers are being applied during that particular movement, the frame 13 is tilted or inclined toward the opposite direction as an incident to the automatic reversing of the direction of movement of the carriage 5. This raises the curved finger 12 that had been in service and lowers the other finger 12 to position for service. For reversing the inclination of the frame 13 the upper ends of the levers 21 are equipped with rollers 45 operating against the under sides of cam bars 46. The cam bars 46 have pin-in-slot connections 47 with the frame 1 and are actuated downwardly by springs 48 (Fig. 2). The cam bars 46 have cam recesses 49 near their ends into which the rollers 45 pass at the ends of the movements of the carriage 5. As the levers 25 start to swing in the opposite directions, the tendency is to swing the lower ends of the levers 21 with them. This tendency is aided and the swinging of the levers 21 is facilitated by the cam recesses 49 which tend to detain the upper ends of the levers 21, with the result that the inclination of the frame 13 is reversed.

As stated the magazine 11 is rotative within the inclinable non-rotative frame 13. A belt 50 passes around the rotative magazine 11 and around a pair of idler pulleys 51 at one end of the carriage 5 and thence over a pair of pulleys 52 and 53 supported at one side of the frame 1. The pulleys 52 and 53 are capable of rotation in opposite directions only; that is, looking at Fig. 2, the pulley 52 is capable of rotation only in a clockwise direction and the pulley 53 is capable of rotation only in a counter-clockwise direction. This requires the belt 50 to rotate the magazine 11 continuously in one direction as an incident to the movement of the carriage 5 in either direction; for which purpose a weight 54 is suspended from a pulley 55 operating within the outer loop of the belt 50. Looking at Fig. 2 and assuming that the carriage 5 is moving toward the right, it will be seen that since the pulleys 52 and 53 can be rotated only in the directions indicated by their respective arrows, the belt 50 is capable of corresponding movement under the influence of the weight 54, thereby rotating the magazine 11. When the direction of movement of the carriage 5 is reversed the belt 50 is still operated under the influence of the weight 54 to continue the rotation of the magazine 11 in the same direction in which it had been rotating. For obtaining this control of the pulleys 52 and 53 to permit rotation thereof in the directions indicated by their respective arrows, and to prevent their rotation otherwise, each of said pulleys is equipped with a clutch device, such as that shown in Fig. 7, which is the clutch device of the pulley 53. As there shown, the axial support or bushing 56 of the pulley is formed with one or more grooves, each of which contains a spring 57 arranged to actuate a clutch element 58 toward an inclined wall 59 at the end of the groove. Thus, the pulley 53 can turn only in a counter-clockwise direction and will be prevented from turning in a clockwise direction because the clutch element 58 rides upon the inclined wall 59 and by wedging action prevents the pulley from turning in a clockwise direction. It will be understood from this that the arrangement of the clutch device in the pulley 52 is simply reversed so that said pulley 52 is capable of rotation only in a clockwise direction, as seen in Fig. 2.

The opposite side of the carriage 5 is equipped with a counter-balance weight 60 connected with the carriage 5 in any appropriate manner to balance it.

As seen in Fig. 1, some of the rows of pins 4 are slightly zigzag requiring corresponding oscillating movements of the washer placing fingers 12. As shown in Figs. 11 and 12, the lower or washer discharging end of each of the fingers 12 is provided with a pair of guide flanges 61 between which the pins 4 pass to engage the washers. The inner ends of the flanges 61 flare divergingly to insure proper entry of the pins 4 between the flanges even though the pins are in zigzag rows. This will oscillate the fingers 12 properly so that the washers will be engaged by the pins. The construction by which proper oscillation of the fingers 12 is permitted is an important feature of the present invention and is clearly shown in Figs. 6 and 8.

As shown the non-rotative frame 13 has depending arms 62 made rigid with the frame 13 by screw bolts 63. The outer face of each of the arms 62 is formed with a vertical groove 64 having a rounded bottom wall (Fig. 8) and receiving a matching rounded flange 65 on a supporting block 66 of the corresponding finger 12. The upper ends of the blocks 66 are formed with shoulders 67 bearing upon the upper ends of shoulders of the arms 62. Thus the fingers 12 are supported by the shoulders 67 engaging supporting shoulders on the arms 62 of the frame 13. This connection permits lateral inclination of either of the blocks 66 in the vertical planes thereof toward either side of its supporting arm 62. The tongue and groove connections 64—65 normally hold the blocks 66 in one position but permit slight lateral inclination thereof, as stated, in order to move the lower ends of the fingers 12 as required to deliver washers to pins in slightly zigzag rows. The inclinable blocks 66 of the fingers 12 are connected by strong springs 68 (Fig. 6) which hold the washer delivering fingers in such connection with their supporting arms 62 as will permit proper action of said fingers to deliver washers to straight rows of pins 4 or to slightly zigzag rows thereof. The engagement of the fingers with the pins in zigzag rows swings the fingers slightly thereby tilting the blocks 66, as stated.

The carriage 8 is arranged for step-by-step movement upon the carriage 5. When washers have been placed in all the pins in a row of pins 4 and the direction of movement of the carriage 5 is reversed and the carriage 8 is moved over one step on the carriage 5 so as to place one of the fingers 12 in position to place washers on the next row of pins. This step-by-step movement of the carriage 8 upon the carriage 5 is controlled by an escapement mechanism.

As shown in Figs. 4 and 5, the carriage 5 supports a pair of toothed escapement bars 69 which have arms 70 in releasable connection therewith. The arms 70 have pin-in-slot connections 71 with the carriage 5 so as to permit sufficient movement of the escapement bars 69 to effect step-by-step movement of the carriage 8. As stated, the escapement bars 69 are releasable from the arms 70 so that bars having their teeth different distances apart may be used when desired in order to step the carriage 8 in conformity with the rows of pins 4. The rows of pins 4 in different molds are different distances apart; that is, in the case of small heels the rows of pins are closer to each other than they are in the case of large heels. Therefore, it is desirable to step the carriage 8 in conformity with the rows of pins and for this reason the escapement bars 69 are interchangeable.

An escapement detent 72 on one side of the carriage 8 is arranged for cooperative action with the adjacent escapement bar 69 (Fig. 5), while a detent 73 is arranged for cooperative action with the other escapement bar 69 (Fig. 4). The arrangement is such that when the escapement detent 72 is against a tooth, as shown in Fig. 5, the escapement detent 73 is under the lower end of a tooth on the adjacent escapement bar 69, and vice versa. As the carriage 5 approaches the end of each movement thereof, the ends of the arms 70 engage and ride upon the inclined surfaces of arms 74 on the frame 1, thus raising the escapement bar 69 that is holding the carriage 8. The other escapement bar 69 is not raised at this time so that the carriage 8 moves one space or step until stopped by the escapement detent 72 or 73 engaging a tooth on the associated escapement bar 69. That is, when the escapement bar associated with the detent 72 is raised, the carriage 8 is moved over one step on the carriage 5 until the detent 73 strikes a tooth on the associated escapement bar 69 and is stopped thereby, due to the fact that the escapement bar 69 associated with the detent 73 is not raised at this time. So, also, when the escapement bar 69 that is associated with the detent 73 is raised, as described, the carriage 8 is moved over one step on the carriage 5 and is stopped by the detent 72 engaging a tooth on the associated escapement bar 69, due to the fact that the escapement bar 69 associated with the detent 72 is not raised when the other escapement bar is raised. The carriage 8 will be moved in this way at the completion of each movement of the carriage 5, the weighted belt 50 serving to move the carriage 8.

From the foregoing it will be seen that my invention accomplishes all of its intended objects and purposes and has numerous advantages. At the present time it is the usual practice to place washers upon the pins 4 manually which requires long training and experience before an operator acquires the skill necessary to make proper speed and progress. By this machine the washers can be placed upon all of the pins of a mold in a very small fraction of the time required by a skilled operator to place the washers on the pins. The output is thus greatly increased and the cost of production is largely reduced.

The machine is efficient and accurate in operation and does not require the long training or skill on the part of the operator that is required in the case of workmen placing washers by hand.

It is apparent that the construction and arrangement may be varied in numerous particulars other than the ones specially mentioned herein. We do not restrict ourselves in any particular whatever except as set forth in the appended claims.

What we claim and desire to secure by Letters Patent is:—

1. A machine of the character described, comprising a magazine for containing washers, a finger for guiding the washers to position for engagement by the pins on which the washers are to be placed, and a support for the finger permitting oscillation of the finger to deliver washers to pins in zigzag rows.

2. The combination with a magazine for containing washers, of a finger for guiding the washers from the magazine to points of delivery, and a support for the finger permitting oscillation thereof to deliver washers in zigzag rows.

3. A machine of the character described, comprising a support for washers, a support for a mold plate, a finger in connection with the washer support for guiding washers from the washer support to the mold plate, and means for moving one of said supports relative to the other.

4. A machine of the character described, comprising a support for washers, a support for a pin plate of a mold, a finger for guiding washers from the washer support for delivery to the pins on the mold plate of said other support, and mechanism for moving one of said supports relatives to the other to cause the pins on the mold plate to engage washers delivered thereto by said finger.

5. In a machine of the character described, the combination of a support for washers, a support for a pin plate of a rubber heel mold, a finger in connection with the washer support for guiding washers for delivery to the pins on the mold plate, mechanism for moving one of said supports in one direction to cause washers to be placed on all of the pins in a row of pins, and mechanism for moving one of said supports in another direction to cause washers to be placed on all of the pins in another row of pins.

6. A machine of the character described, comprising a magazine for containing washers, a finger from the magazine for conducting washers from the magazine to position for engagement by pins to which the washers are to be applied, and means holding said finger normally in position to apply washers to pins in a straight row and permitting oscillation of said finger to apply washers to pins in a zigzag row.

7. A machine of the character described, comprising a magazine for containing washers, a finger from the magazine for conducting washers from the magazine to position for engagement by pins to which the washers are to be applied, means holding said finger normally in position to apply washers to pins in a straight row and permitting oscillation of said finger to apply washers to pins in a zigzag row, and means removing said magazine and said finger to apply washers to pins in different rows of pins.

8. A machine of the character described, comprising a magazine for containing washers, a finger from the magazine for conducting washers from the magazine to a position for engagement by pins to which the washers are to be applied, means for moving the magazine and the finger to position to serve washers successively to different rows of pins, and a support for said finger permitting oscillation thereof to apply washers to pins in zigzag rows.

9. In a machine of the character described, a magazine for containing washers, a finger for guiding the washers from the magazine to position for engagement by pins to which the washers are to be applied, mechanism for removing the magazine and the finger to apply washers to all of the pins in a row of pins, and means for rotating the magazine as an incident to the movement of the magazine in one direction.

10. A machine of the character described, comprising a magazine for containing washers, fingers from the magazine for conducting washers from the magazine to positions for engagement by pins to which the washers are to be applied, means for moving the magazine and the fingers to apply washers successively to pins in different rows of pins, and means for rotating the magazine as an incident to movement thereof in either direction.

11. A machine of the character described, comprising a magazine arranged to contain washers, a pivoted finger for conducting washers from the magazine to position for engagement by pins to which the washers are to be applied, and means for moving the magazine and the finger to place washers on all of the pins in a row of pins.

12. A machine of the character described, comprising a magazine arranged to contain washers, a support for the pin plate of a heel mold, a finger for guiding the washers from the magazine to the pins on said plate, and mechanism for changing the relative positions of the magazine and the finger as compared with the mold plate, whereby the washers will be applied to pins in different rows of pins.

13. A machine of the character described, comprising a magazine arranged to contain washers, a support for the pin plate of a heel mold, a finger for guiding the washers from the magazine to the pins on said plate, and mechanism for changing the relative positions of the magazine and the finger as compared with the mold plate, whereby washers will be applied to all of the pins in a row of pins.

14. In a machine of the character described, the combination of a reciprocating carriage, a magazine supported by said carriage and movable to different inclined positions, fingers for conducting washers from the magazine to the work, and devices cooperating with said moving means to tilt the magazine to different inclined positions to place the different fingers in service.

15. A machine of the character described, comprising a magazine arranged to contain washers, and movable fingers in connection with the magazine for conducting washers from the magazine to position for engagement by pins in zigzag rows.

16. A machine of the character described, comprising a magazine arranged to contain washers, and movable fingers in connection with the magazine for conducting washers from the magazine to position for engagement by pins in zigzag rows, whether the pins be moved into engagement with the washers delivered thereto by the fingers or whether the washers be moved into engagement with the pins by movement of the fingers.

17. A machine of the character described, comprising a magazine, and a movable finger in connection with the magazine for conducting washers to position for engagement by pins in a zigzag row of pins, whether the pins be moved into engagement with the washers or whether the fingers move the washers into engagement with the pins.

18. In a machine of the character described, a magazine arranged to contain washers, fingers for conducting the washers from the magazine to positions for engagement by the pins, mechanism for moving the magazine in different directions to place the different fingers in service, and means for rotating the magazine continuously in one direction irrespective of the direction in which the magazine be moved as aforesaid.

19. A machine of the character described, comprising a supporting carriage, a washer magazine mounted in the supporting carriage for lateral and rotary movements therein, fingers for conducting washers from the magazine to the work, construction permitting oscillation of the fingers to deliver washers in zigzag rows, mechanism for operating said carriage, and means for rotating the magazine.

20. In a machine of the character described, a carriage, a magazine mounted in the carriage, levers in connection with the magazine, actuators engaging said levers for moving the carriage laterally in opposite directions, and means cooperating with said levers to tilt the magazine to different inclined positions.

21. In a machine of the character described, a carriage, a magazine mounted in the carriage, levers in connection with the magazine, actuators engaging said levers for moving the carriage laterally in opposite directions, and means cooperating with said levers to tilt the magazine to different inclined positions, as an incident to change of direction of movement of the carriage.

22. In a machine of the character described, a carriage, a magazine mounted in the carriage, levers in connection with the magazine, actuators engaging said levers for moving the carriage laterally in opposite directions, means cooperating with said levers to tilt the magazine to different inclined positions, and means for rotating the magazine in the same direction during movement of said carriage in either direction.

23. In a machine of the character described, a carriage, a magazine mounted in the carriage, levers in connection with the magazine, actuators engaging said levers for moving the carriage laterally in opposite directions, means cooperating with said levers to tilt the magazine to different inclined positions as an incident to change of direction of movement of the carriage, and means for rotating the magazine in the same direction during movement of said carriage in either direction.

24. In a machine of the character described, a carriage mounted for movements alternately in opposite directions, levers for moving said carriage, a magazine in said carriage, arranged to contain washers, and fingers for conducting the washers from the magazine to points of use.

25. A machine of the character described, comprising a carriage mounted for movements alternately in opposite directions, a magazine in the carriage arranged to contain washers, levers for moving the carriage alternately in opposite directions, a motor, mechanism driven by the motor for operating said levers to move the carriage as aforesaid, and fingers for conducting washers from the magazine to points of use.

26. A machine of the character described, comprising a support for washers, a support for a mold plate, a finger in connection with the washer support for guiding washers from the washer support to the mold plate, means for moving the washer support and the finger to apply washers to the several pins in a row of pins, mechanism for moving the washer support to a position for applying washers to pins in another row of pins, and another finger in connection with the washer support for applying pins on said other row of pins.

27. In a machine of the character described, a carriage mounted for movement longitudinally in the machine, an additional carriage mounted on the first-named carriage for movement therewith and for lateral movement on said first-named carriage, a magazine on the additional carriage arranged to be moved to different inclined positions, mechanism for moving the first-named carriage back and forth longitudinally of the machine, means for rotating said magazine continuously in any direction and an incident to the movement of the first-named carriage in either direction, means for reversing the inclination of said magazine as an incident to the change of direction of the movement of the first-named carriage, means for moving the additional carriage laterally on the first-named carriage at the end of each movement of the first-named carriage, and a passage from said magazine for delivering washers to a point of use.

28. A machine of the character described, comprising a passage for conducting washers to position for engagement by pins to which the washers are to be applied, mechanism for delivering the washers into said passage, and means for moving the passage to place washers on all pins in different rows of pins.

29. A machine of the character described, comprising a carriage, a magazine supported by the carriage, a passage supported by the carriage for conducting washers from the magazine to position for engagement by pins to which the washers are to be applied, and means for operating the carriage to cause washers to be engaged by all of the pins in a row and then moving the carriage to position for operation to cause washers to be engaged by all of the pins in another row.

30. A machine of the character described, comprising a carriage arranged for reciprocating movements, a magazine supported by the carriage, a passage from the magazine for conducting washers from the magazine to a position for engagement by pins to which the washers are to be applied, and means for moving the magazine to cause the washers therein to enter said passage.

31. A machine of the character described, comprising a carriage arranged for reciprocating movements, a magazine supported by the carriage, a passage from the magazine for conducting washers from the magazine to a position for engagement by pins to which the washers are to be applied, and means for moving the magazine to cause the washers therein to enter said passage, and to assume different positions to apply washers to different series of pins.

32. A machine of the character described, comprising a carriage, mechanism for reciprocating said carriage, an additional carriage supported by the first one, a magazine supported by the additional carriage, passages for conveying washers from the magazine to positions for engagement by pins to which the washers are to be applied, and means for moving said additional carriage to different adjusted positions as required to apply washers to different series of pins.

33. In a machine of the character described, the combination of a reciprocating carriage, a magazine supported by said carriage and movable to different inclined positions, passages for conducting washers from the magazine to the work, and means for tilting the magazine to different inclined positions to place the different passages in service.

34. In a machine of the character described, the combination of a reciprocating carriage, a magazine supported by said carriage and movable to different inclined positions, passages for conducting washers from the magazine to the work, means for tilting the magazine to different inclined positions to place the different passages in service, and means for moving the magazine and the passages laterally to different service positions.

35. A machine of the character described, comprising passages for conducting washers to the work to which the washers are to be applied, a magazine arranged to contain the washers, means for supporting the passages in position to cause the passages successively to deliver washers to the work, and mechanism for operating the magazine to tumble the washers into said passages.

36. A machine of the character described, comprising a tumbling magazine arranged to contain washers, curved passages for conducting the washers to the work, means for supporting the passages in position to cause the passages successively to deliver the washers to the work, and means for operating the magazine to tumble the washers into said passages.

37. A machine of the character described, comprising a carriage, a tumbling magazine supported by the carriage, curved passages for conducting washers from the magazine to the work to which the washers are to be applied, means for supporting the passages in position to cause the passages successively to deliver washers to the work, mechanism for operating the magazine to tumble the washers in said passages, and mechanism for moving the carriage to deliver the washers from said passages to different points on the work.

38. In a machine of the character described, a supporting carriage arranged to move back and forth adjacent to the work, a magazine carriage mounted on the supporting carriage for lateral movements thereon, a magazine supported by the magazine carriage, curved passages for conducting washers from the magazine to the work, means for placing said curved passages alternately in positions for service, and means for operating the magazine to tumble the washers into said passages.

39. A machine of the character described, comprising a laterally movable carriage, a tumbling magazine mounted in said carriage, passages for conducting washers from the magazine to points of use, means for operating the magazine to tumble the washers therein into said passages, means for tilting the magazine to different inclined positions to place the passages alternately in positions for service, and means for moving said carriage to convey said magazine and said passages to different operative positions.

40. A machine of the character described, comprising a support, a carriage mounted on said support, mechanism for operating said carriage alternately in opposite directions, an additional carriage mounted for lateral movements on the first-named carriage, a tumbling magazine mounted in said second carriage, passages for conducting washers from the tumbling magazine to different points of use in any position of said second carriage on said first carriage, means for moving said second carriage to different positions on the first carriage, means for holding the second carriage in different adjusted positions on the first carriage, means for operating said magazine to tumble washers into said passages, and means for tilting said magazine to different inclined positions to place said passages alternately in service.

ABRAHAM MANHEIMER.
FREDERICK M. ETTER.
JULIUS H. KINTZELE.